(12) United States Patent
Gurudoss et al.

(10) Patent No.: US 9,412,245 B2
(45) Date of Patent: Aug. 9, 2016

(54) SYSTEM AND METHOD FOR VISUALIZATION OF HISTORY OF EVENTS USING BIM MODEL

(71) Applicant: HONEYWELL INTERNATIONAL INC., Morristown, NJ (US)

(72) Inventors: Malayappan Gurudoss, Tamil Nadu (IN); Vinoth Dharmalingam, Tamil Nadu (IN); Kalpana Janapati, Andra Pradesh (IN); Viswanathan Chatapuram Krishnan, Tamil Nadu (IN); Vinay Venkatesh, Karnataka (IN); Paul M. Popowski, Lake Mills, WI (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 364 days.

(21) Appl. No.: 13/962,228

(22) Filed: Aug. 8, 2013

(65) Prior Publication Data
US 2015/0043887 A1 Feb. 12, 2015

(51) Int. Cl.
*G08B 13/196* (2006.01)
*H04N 5/91* (2006.01)

(52) U.S. Cl.
CPC .... *G08B 13/19691* (2013.01); *G08B 13/19697* (2013.01); *H04N 5/91* (2013.01)

(58) Field of Classification Search
None
See application file for complete search history.

(56) References Cited

U.S. PATENT DOCUMENTS

| | | | |
|---|---|---|---|
| 8,468,562 B2 | 6/2013 | Miller et al. | |
| 2008/0285940 A1* | 11/2008 | Kulas | G11B 27/3027 386/248 |
| 2009/0251537 A1* | 10/2009 | Keidar | G08B 13/19645 348/143 |
| 2010/0002082 A1* | 1/2010 | Buehler | G08B 13/19693 348/159 |
| 2010/0118147 A1* | 5/2010 | Dorneich | H04N 7/185 348/155 |
| 2011/0178775 A1* | 7/2011 | Schoning | G06F 11/28 702/190 |
| 2012/0050479 A1* | 3/2012 | Karaoguz | H04N 13/0011 348/46 |
| 2013/0124997 A1* | 5/2013 | Speir | H04N 5/76 715/721 |

OTHER PUBLICATIONS

Official Action from corresponding Canadian patent application 2,857,886, dated Feb. 16, 2016.

* cited by examiner

*Primary Examiner* — Kate Luo
(74) *Attorney, Agent, or Firm* — Husch Blackwell LLP

(57) ABSTRACT

A method and apparatus are provided, wherein the method includes the steps of a building information model (BIM) of a security system providing a three-dimensional view of a secured area of the security system, including the physical location of any sensors of the security system, an input device of the security system receiving from a user a starting time and ending time of a time interval of interest, and a processor of the security system displaying the three-dimensional view of the secured area, including a time scale showing the starting time on one end of the time scale and the ending time at an opposing end of the time scale and a respective popup of details for each corresponding sensor of at least some sensors of the security system activated during the time interval of interest, each respective popup graphically connected to the physical location of the corresponding sensor within the three dimensional view.

20 Claims, 5 Drawing Sheets

SYSTEM AND METHOD FOR VISUALIZATION OF HISTORY OF EVENTS USING BIM MODEL

FIELD

The field relates to security systems and more particularly to methods of tracking events within security systems.

BACKGROUND

Security systems for the protection of homes and/or businesses are generally known. Such systems typically involve the use of one or more sensors located on the doors or windows surrounding a secured area for the detection of intruders.

The sensors of a security system are typically monitored via an alarm panel either located within the home or business or at a central monitoring station. Upon activation of one of the sensors, the alarm panel may activate an alarm.

While some security systems may be monitored by a full time security guard, many security systems are only monitored indirectly via the reporting of security events to a central monitoring station. Upon detecting an alarm, the guard or central monitoring station may respond by summoning the police.

In most cases, security events are typically saved into an event file including an identifier of the sensor raising the alarm and a time of activation of the sensor. The event files are important during any investigation into events in order to determine how an intruder entered the secured area and the identity of the intruder.

While existing security systems work well, the security events saved into the event files are difficult to read and interpret. Accordingly, a need exists for better methods of recording and presenting such events.

DETAILED DESCRIPTION OF AN ILLUSTRATED EMBODIMENT

Figure 1:
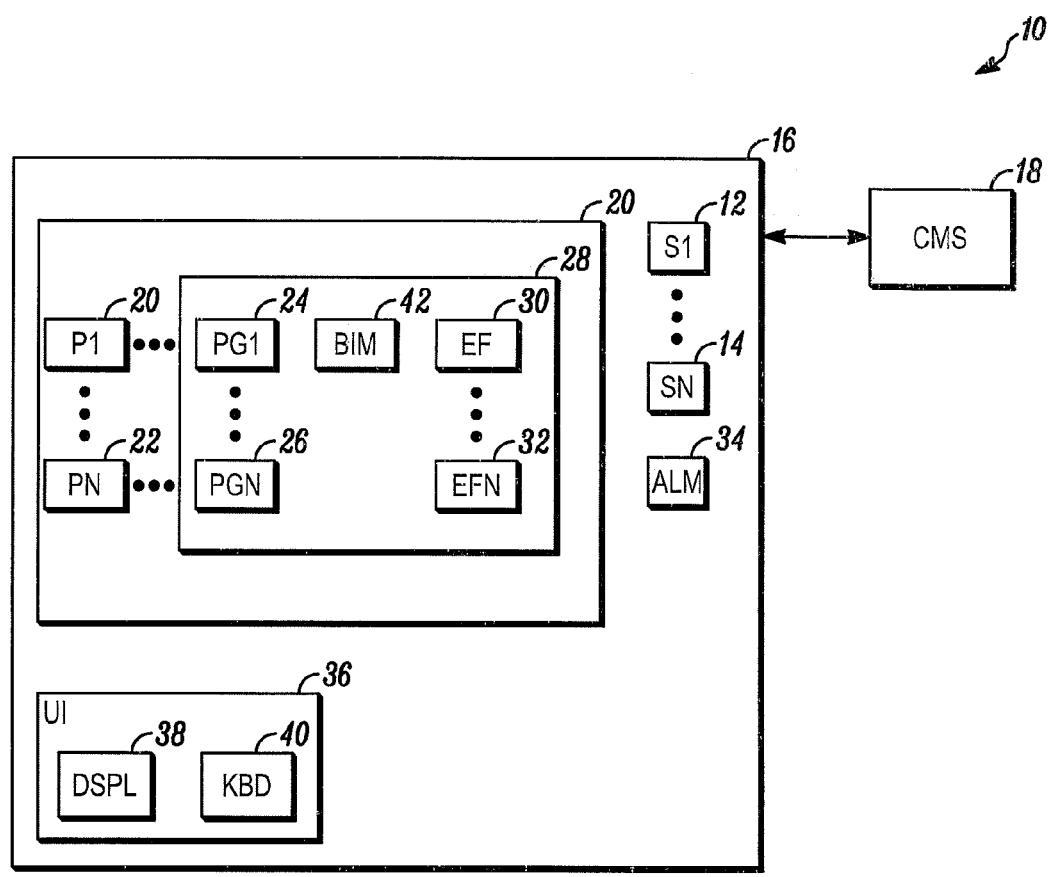
FIG. 1 is a block diagram of a security system shown generally in accordance with an illustrated embodiment.

While embodiments can take many different forms, specific embodiments thereof are shown in the drawings and will be described herein in detail with the understanding that the present disclosure is to be considered as an exemplification of the principles hereof, as well as the best mode of practicing same. No limitation to the specific embodiment illustrated is intended.

FIG. 1 is a block diagram of a security system 10 shown generally in accordance with an illustrated embodiment. Included within the system is a number of sensors 12, 14 used to protect a secured area 16. The sensors may be limited switches mounted on doors and/or windows located along a periphery of the secured area that detect entry of intruders into the secured area. The sensors could also be motion detectors based upon passive infrared (PIR) devices or cameras that perform video processing of video images to detect changes between successive frames. The sensors could also be environmental detectors based upon any of a number of different technologies (e.g., smoke detectors, carbon monoxide detectors, natural gas detectors, etc.).

The sensors may be monitored by a control panel 20 located within the secured area or within a central monitoring station 18. Upon detecting activation of one of the sensors (either directly where the control panel is located at the central monitoring station or via a message sent to the central monitoring station where the control panel is located within the secured area), the central monitoring station may respond by summoning the appropriate help (e.g., police, fire department, etc.).

Located within the control panel may be one or more processor apparatus (processors) 20, 22, each operating under control of one or more computer programs 24, 26 loaded from a non-transitory computer readable medium (memory) 28. As used herein, reference to a step performed by a program is also reference to the processor that executed that step.

Included within the control panel is an alarm processor that monitors the status of each of the sensors. Upon detection of activation of one of the sensors, the alarm processor may activate a local alarm 34 to notify authorized occupants of the secured area and may also summon help.

Also located within the control panel may be an event processor. Upon activation of one of the sensors, the event processor saves an event into an event file 30, 32 or may add an entry into a preexisting event file within memory. The entry may include an identifier of the activated sensor and a time of the event.

Also associated with the secured area is a user interface 36. The user interface may include an interactive display 38 or a display and separate keyboard 40. The user interface may be located on the control panel where the control panel is located within the secured area or may be a stand-alone device.

The user interface may be used to arm or disarm the security system protecting the secured area. The user interface may also display alarm events. In order to arm or disarm the system, an authorized user may enter a personal identification number (PIN) and a function key (e.g., arm, arm away, disarm, etc.). The user interface may respond with a graphical indicator showing the status of the local alarm system.

In addition to the user interface, the security system may also include sensors that allow access into the secured area by authorized users. In this case, at least one of the sensors could be a card reader that reads an identify card carried by an authorized user and grants access into the secured area.

Also included within the security system is a building information model (BIM) 42. The BIM may contain three-dimensional views of the secured area along with geographical coordinates of each of the sensors within the secured area.

Figure 5:
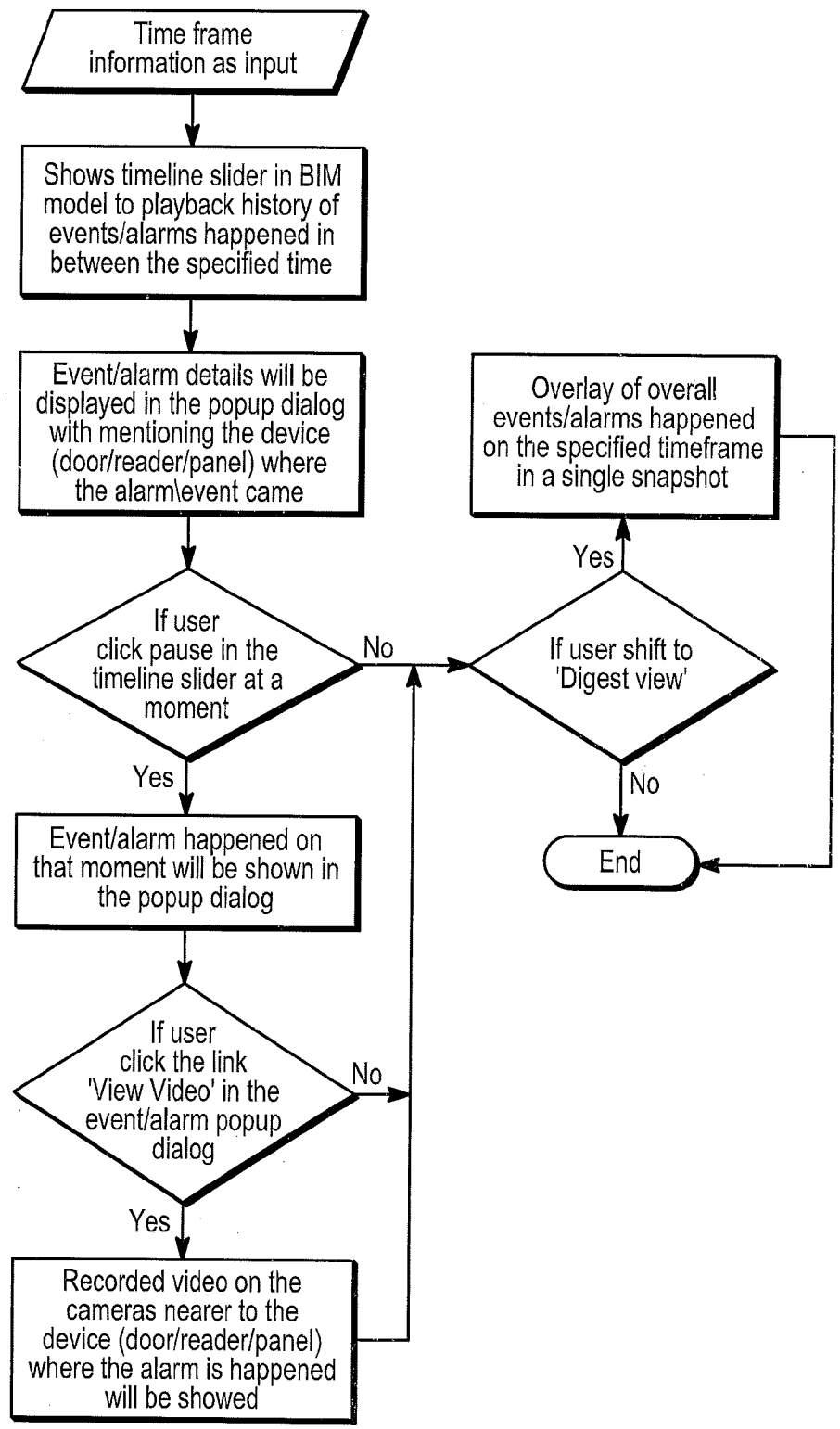
FIG. 5 shows a set of method steps that may be used by the system of FIG. 1.

The BIM is used along with the event files by an event display system including one or more event processors 20, 22 to display events on the user interface under a process shown generally in FIG. 5. For example, the user may enter a time through the user interface and the event processor may display events that happened at that time on a three-dimensional view of the secured area or portion of the secured area along with a graphical indicator on the three dimensional view that indicates where that event occurred. A respective popup may also be displayed that includes information about the event. Alternatively, the user may identify a time interval of interest by entering a starting time and ending time and the video processor may show the events that occurred within that time period. A sequence processor may also play back the events in the sequence as they occurred.

Figure 2:
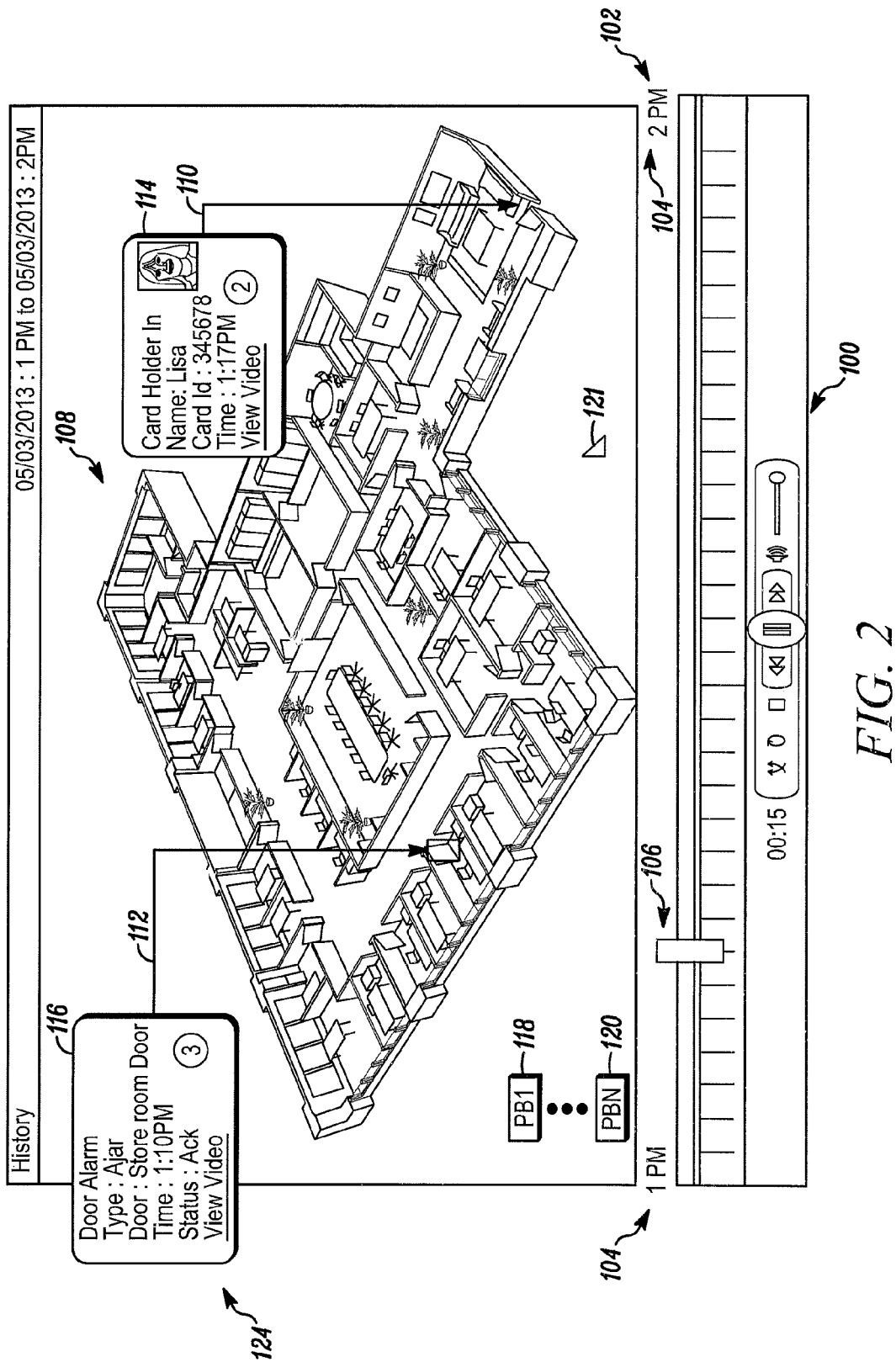
FIG. 2 depicts a screen that may be shown on a display of the system of FIG. 1.

FIG. 2 depicts a screen 100 shown on the display by one or more of the event processors. The screen may include a number of information elements. For example, the screen may include a time scale 102 including the entered start time 104 and end time 104. The time scale may also include a time indicator 106.

Also included within the screen may be one or more graphical indicators 110, 112 that show the geographical locations of sensors activated between the start time and the location of the indicator 106 on the time scale. Associated with the graphical indicators may be a respective popup 114, 116 that shows information associated with the respective event. In this regard, the popup may show an identifier of the alarm, the type of alarm, the time and the status. A circled indicator may show the total number of alarms/alerts from the sensor during some predetermined time period.

The screen of FIG. 2 may also include one or more function buttons 118, 120. The function buttons may be used to control the format of information displayed in conjunction with that time interval. For example, one of the function buttons may be a playback button that plays back events as they occurred within the selected area.

In order to use the event display system, the user may first click on an icon of the BIM model displayed on the display of the user interface. In response, a display processor may show a three-dimensional view of the entire secured area including an interactive window through which the user may enter starting and ending times. In the case where the secured area is a multistory building, the three-dimensional view may include a three-dimensional representation of the multi-story building. The user may select one of the stories using a cursor 121 and be presented with the three-dimensional view of one of the stories of the building. The user may enter a start and end time and activate an enter button resulting in a display such as that shown in FIG. 2.

The user may select the time indicator using the cursor and drag the time indicator across the time scale. As the time indicator is dragged across the time scale, a time processor identifies any activated sensors that had been activated between the start time and current location of the time indicator and displays them on the screen including a popup and graphical indicator location showing the location of the sensor within the three-dimensional view.

Alternatively, the user may select a playback button of the function buttons. In this case, the playback processor increments the location of the time indicator at some rate (e.g., 1:1 for playback at the same rate as the events occurred; 2:1 for playback at twice the rate, etc.). In response, the time indicator automatically moves across the time scale incrementally displaying events based upon the location of the time indicator.

As the indicator moves across the time scale, the operator may activate a pause button of the function pushbuttons. While paused, the user may activate a view video pushbutton 124 on any of the popups. Activating the view video pushbutton causes a video processor to retrieve a sequence of video images from one or more cameras that were previously identified within the BIM as capturing images associated with the activated sensor.

Figure 3:
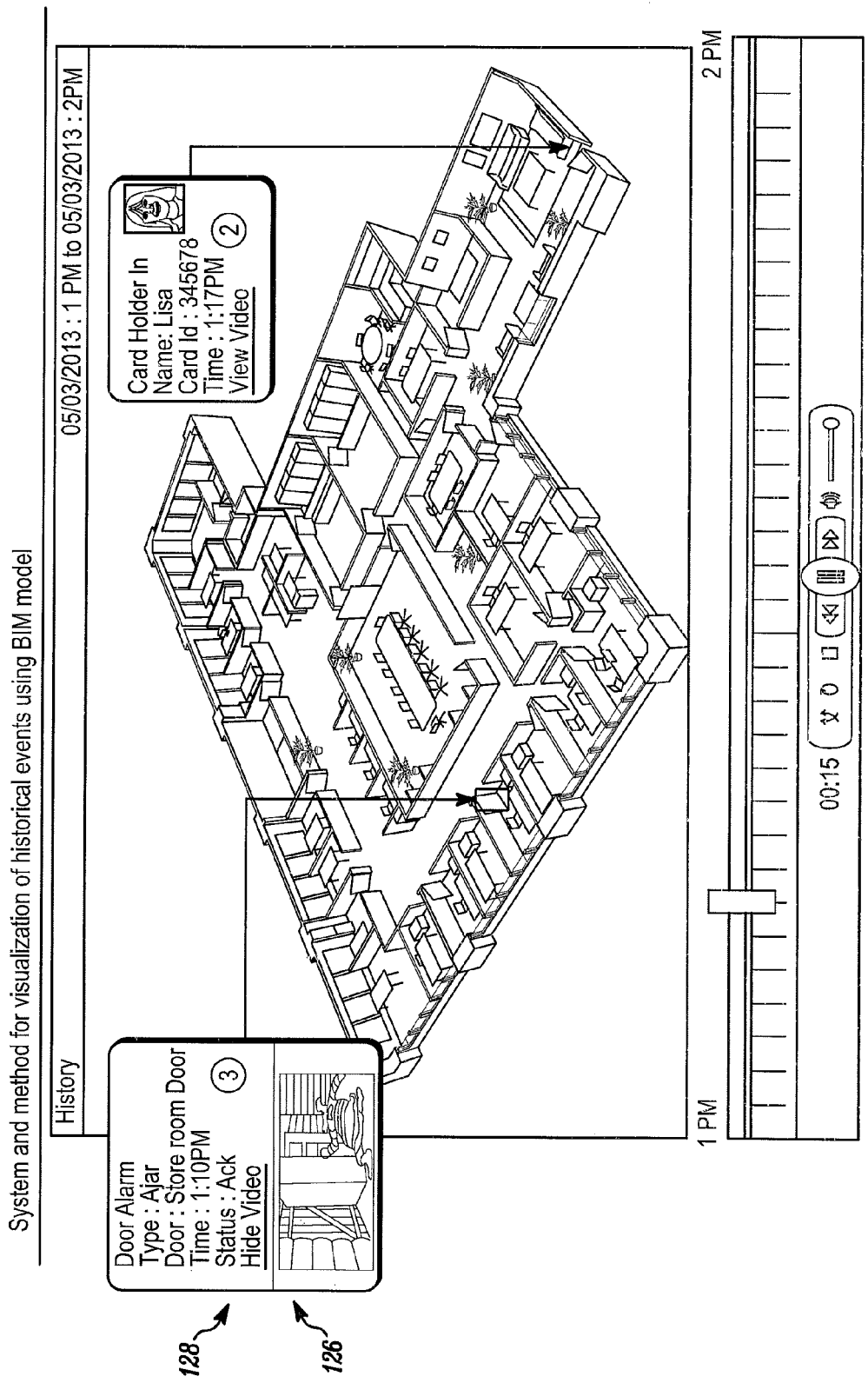
FIG. 3 depicts a screen showing video from the system of FIG. 1.

Once activated, the video processor may display a sequence of images from a predetermined time period before activation of the corresponding sensor until a predetermined time after activation of the sensor. The images may be displayed within a separate window 126 of the popup as shown in FIG. 3.

Once the user has viewed the images associated with the activated sensor, the user may activate a hide video pushbutton 128. In response, the screen may return to the view of FIG. 2. Alternatively, the user may double click on the displayed view and receive a full screen view of the recorded video showing activation of the sensor.

Figure 4:
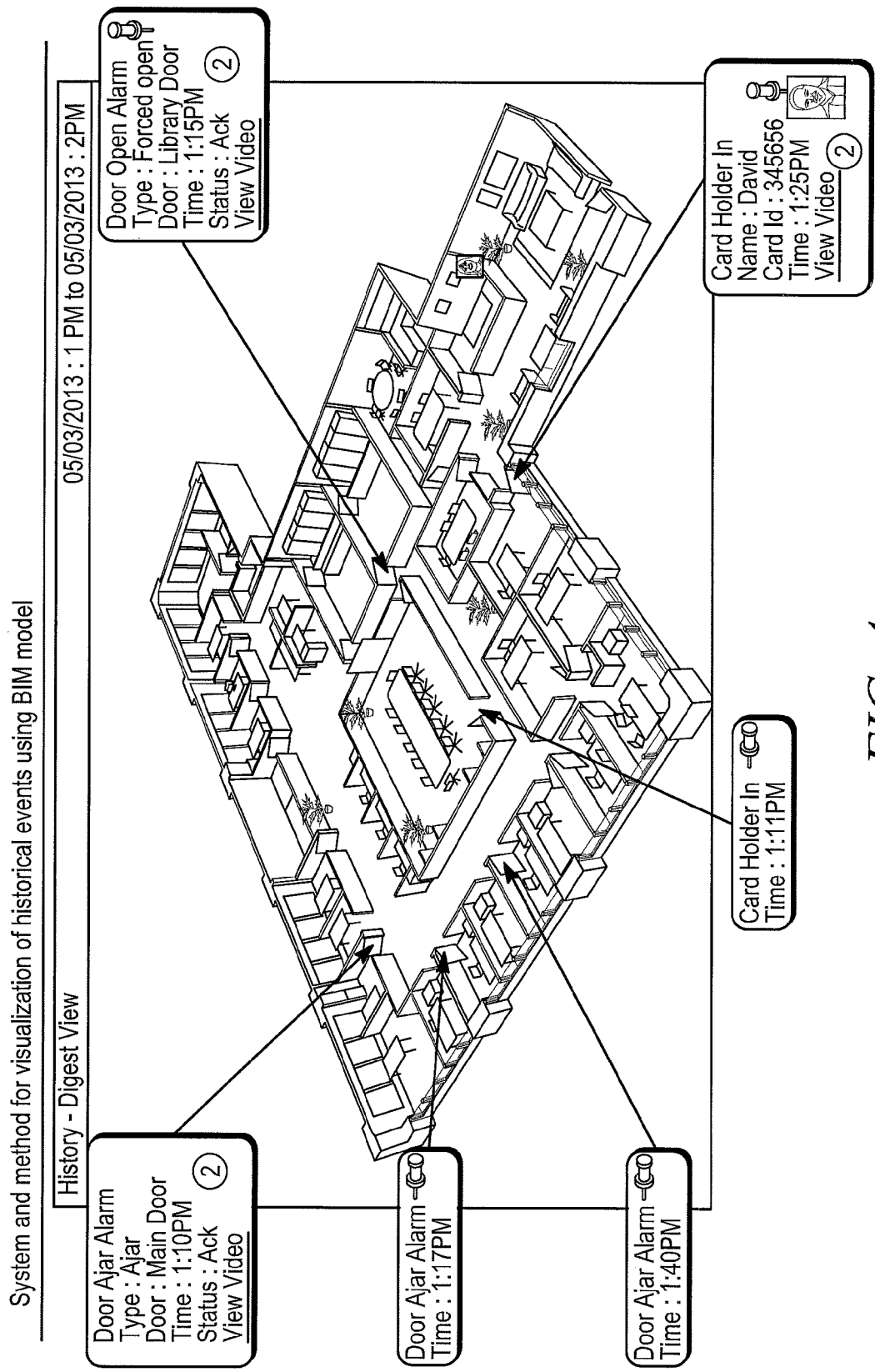
FIG. 4 depicts a digest view of events from the system of FIG. 1.

In addition to viewing video, the user may also activate a digest view pushbutton of the function pushbuttons. In this case, a digest view processor may retrieve and display a history of all activated sensors over some much larger time period as shown in FIG. 4.

In general, the system provides the functionality where all of the events/alarms of the system may be displayed in a specified timeframe. A BIM of the building or other secured area may be used to do this. The display of the system may have a timeline slider used in conjunction with a display under the BIM to playback the history of events/alarms that happened between the limits of the specified time.

The user can choose the timeframe to view the history of alarms/events in the floor/premises of the building using the BIM. In response, the system will play back the history of events/alarms within a 3-D display provided under the BIM of the specified floor/premises by highlighting the device (door/reader/panel). In this regard, any activated sensor may be highlighted with different colors according to the priority of the alarm. The details of that event/alarm are also displayed nearby on the model using an associated window like a popup dialog with the count of the alarm/event that happened from the start to end times of the timeframe.

A user can pause the history timeline at any time to view the events/alarms that happened at that moment and can click on the event/alarm in the popup dialog to see more detail about the alarm. The user can also view the recorded video on the camera nearest the device (door/reader/panel) where the alarm has occurred.

FIG. 2 shows the timeline slider with play/pause option for the time between 1 pm and 2 pm using the BIM of a building. The alarms/events that happened between the time limits in that time frame with their details and their count from the start time of the timeframe are shown as a popup dialog box in the diagram. The device from which the alarm/event originated is highlighted with different colors based on its priority.

FIG. 3 depicts details of how a user may view the recorded video from a camera near the device (door/reader/panel) where the alarm/event occurred. The recorded video of the particular event/alarm is viewed by expanding the link "view video" in the event/alarm popup as shown.

FIG. 4 depicts the "digest view" where a user can view the overlay of all events/alarms that happened during the specified timeframe in a single snapshot view. The user can drill down to see details about individual alarms/events by expanding the popup. The user can open and review the recorded video of that particular event.

The user can instantly shift from the history timeline view to "digest view" if the user wants to see the total count of events/alarms of various devices. The user can switch back and forth between views as and when needed.

The system also includes a "digest view" where a user can view the overlay of all events/alarms that happened on the specified timeframe in a single snapshot view. In the event/alarm popup, the count of alarms/events that happened on the device from the start time of the timeframe will be displayed. The user can drill down to see details about individual alarms/events by expanding the popup. The user can open and review the recorded video of that particular event.

The system solves the problem of viewing alarms/events in a number of ways. First, by providing the play/pause timeline slider for the history of events/alarms in the BIM, the user can visually identify what, when and where an alarm/event occurred. Second, by specifying the count of alarms/events that happed in a time frame, a user can easily identify which region of the building is more alarm prone. By providing a method to view the recorded video from the cameras nearest the areas where an alarm happened in the BIM model itself, a user is more location aware of the context of the alarm/event. By using the "digest view", a user can view the overlay of all events/alarms that happened on the specified timeframe in a single snapshot view.

In general, the system may operate by using a set of steps including a building information model (BIM) of a security system providing a three-dimensional view of a secured area of the security system, including the physical location of any sensors of the security system, an input device of the security system receiving from a user a starting time and ending time of a time interval of interest, and a processor of the security system displaying the three-dimensional view of the secured area, including a time scale showing the starting time on one end of the time scale and the ending time at an opposing end of the time scale and a respective popup of details for each corresponding sensor of at least some sensors of the security system activated during the time interval of interest, each respective popup graphically connected to the physical location of the corresponding sensor within the three dimensional view.

The system may accomplish these steps using an apparatus including a building information model (BIM) of a security system embodied in a non-transient computer readable medium, wherein the BIM provides a three-dimensional view of a secured area of the security system, including the physical location of any sensors of the security system, an input device of the security system that receives from a user a starting time and ending time of a time interval of interest, and a processor of the security system that displays the three-dimensional view of the secured area, including a time scale showing the starting time on one end of the time scale and the ending time at an opposing end of the time scale and a respective popup of details for each corresponding sensor of at least some sensors of the security system activated during the time interval of interest, each respective popup graphically connected to the physical location of the corresponding sensor within the three dimensional view.

In alternate embodiments, the system may include a security system that protects a secured area, a building information model (BIM) of the security system embodied in a non-transient computer readable medium, wherein the BIM provides a three-dimensional view of the secured area of the security system, including the physical location of a plurality of sensors of the security system, an input device of the security system that receives from a user a starting time and ending time of a time interval of interest, and a processor of the security system that displays the three-dimensional view of the secured area, including a time scale showing the starting time on one end of the time scale and the ending time at an opposing end of the time scale and a respective popup of details for each corresponding sensor of the plurality of sensors that were activated during the time interval of interest, each respective popup graphically connected to the physical location of the corresponding sensor within the three dimensional view.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims.

The invention claimed is:

1. A method comprising:
a building information model (BIM) of a security system providing a three-dimensional representation of a secured area of the security system, including a physical location of sensors of the security system;
an events processor detecting activation events from the sensors of the security system and storing the detected activation events in an events file, wherein the events file stores, for each respective activation event, a respective sensor that detected the respective activation event and a respective time when the respective sensor detected the respective activation event;
an input device of the security system receiving, from a user, a starting time and an ending time of a time interval of interest; and
a display processor of the security system displaying the three-dimensional representation of the secured area, including a time scale showing the starting time on one end of the time scale and the ending time at an opposing end of the time scale, and indicating, on the three-dimensional representation, each detected activation event stored in the events file that occurred after the starting time and before the ending time by generating a respective popup of details for each detected activation event, the display processor displaying the respective popup when a time indicator associated with the time scale corresponds to the respective time stored in the events file when the respective sensor activated the display processor displaying the respective popup at a geographic location corresponding to the respective sensor that detected the respective activation event within the three-dimensional representation.

2. The method as in claim 1 further comprising:
the user activating the time scale; and
a playback processor of the security system playing back activation of at least some of the sensors in accordance with the time indicator incrementing along at least a portion of the time interval between the starting time and the ending time.

3. The method as in claim 1 further comprising the respective popup including a view video activation button.

4. The method as in claim 3 further comprising the user activating the view video activation button and viewing video associated with activation of the respective sensor.

5. The method as in claim 1 wherein the respective sensor further comprises an intrusion sensor.

6. The method as in claim 1 wherein at least some of the sensors further comprise a card reader.

7. The method as in claim 1 further comprising displaying a graphical connector between the respective popup and the geographic location corresponding to the respective sensor that detected the respective activation event within the three-dimensional representation, wherein the graphical connector further comprises an arrow leading from the respective popup to the geographic location corresponding to the respective sensor.

8. An apparatus comprising:
a building information model (BIM) of a security system embodied in a non-transient computer readable medium, wherein the BIM provides a three-dimensional representation of a secured area of the security system, including a physical location of sensors of the security system;

an events processor configured to detect activation events from the sensors of the security system and to store the detected activation events in an events file, wherein the events file stores, for each respective activation event, a respective sensor that detected the respective activation event and a respective time when the respective sensor detected the respective activation event;

an input device of the security system that receives, from a user, a starting time and an ending time of a time interval of interest; and a display processor of the security system configured to (1) display the three-dimensional representation of the secured area, including a time scale showing the starting time on one end of the time scale and the ending time at an opposing end of the time scale, and (2) indicate, on the three-dimensional representation, each detected activation event stored in the events file that occurred after the starting time and before the ending time by generating a respective popup of details for each detected activation event, the display processor displaying the respective popup when a time indicator associated with the time scale corresponds to the respective times stored in the events file when the respective sensors activated, the display processor displaying the respective popup at a geographic location corresponding to the respective sensor that detected the respective activation event within the three-dimensional representation.

9. The apparatus as in claim 8 further comprising a play button that plays back activation of at least some of the sensors in accordance with the time indicator, wherein the time indicator increments along at least a portion of the time interval between the starting time and the ending time.

10. The apparatus as in claim 8 wherein the respective popup includes a view video activation button.

11. The apparatus as in claim 10 wherein the user activates the view video activation button to view video associated with activation of the respective sensor.

12. The apparatus as in claim 8 wherein the respective sensor further comprises an intrusion sensor.

13. The apparatus as in claim 8 wherein at least some of the sensors further comprises a card reader.

14. The apparatus as in claim 8 further comprising a graphical connector displayed between the respective popup and the geographic location corresponding to the respective sensor that detected the respective activation event within the three-dimensional representation, wherein the graphical connector further comprises an arrow leading from the respective popup to the geographic location of the respective sensor.

15. An apparatus comprising:
a security system that protects a secured area;
a building information model (BIM) of the security system embodied in a non-transient computer readable medium, wherein the BIM provides a three-dimensional representation of the secured area of the security system, including a physical location of a plurality of sensors of the security system;

an events processor configured to detect activation events from each of the plurality of sensors of the security system and to store the detected activation events in an events file, wherein the events file stores, for each respective activation event, a respective sensor that detected the respective activation event and a respective time when the respective sensor detected the respective activation event;

an input device of the security system that receives, from a user, a starting time and an ending time of a time interval of interest; and a display processor of the security system configured to (1) display the three-dimensional representation of the secured area, including a time scale showing the starting time on one end of the time scale and the ending time at an opposing end of the time scale, and (2) indicate, on the three-dimensional representation, each detected activation event stored in the events file that occurred after the starting time and before the ending time by generating a respective popup of details for each detected activation event, the display processor displaying the respective popup when a time indicator associated with the time scale corresponds to the respective time stored in the events file when the respective sensor activated, the display processor displaying the respective popup at a geographic location corresponding to the respective sensor that detected the respective activation event within the three-dimensional representation.

16. The apparatus as in claim 15 further comprising:
a play button activated by the user; and
a playback processor associated with the time scale,
wherein the playback processor plays back activation of at least some of the plurality of sensors in accordance with the time indicator, and
wherein the time indicator increments along at least a portion of the time interval between the starting time and the ending time.

17. The apparatus as in claim 15 further comprising a view video pushbutton associated with the respective popup.

18. The apparatus as in claim 15 further comprising a video processor that displays video associated with the respective sensor in response to the user activating the view video pushbutton.

19. The apparatus as in claim 15 further comprising a graphical connector displayed between the respective popup and the geographic location corresponding to the respective sensor that detected the respective activation event within the three-dimensional representation, wherein the graphical connector further comprises an arrow leading from the respective popup to the location of the respective sensor.

20. The apparatus as in claim 15 wherein the respective sensor further comprises one of an intrusion sensor and a card reader.

* * * * *